Figure 1:
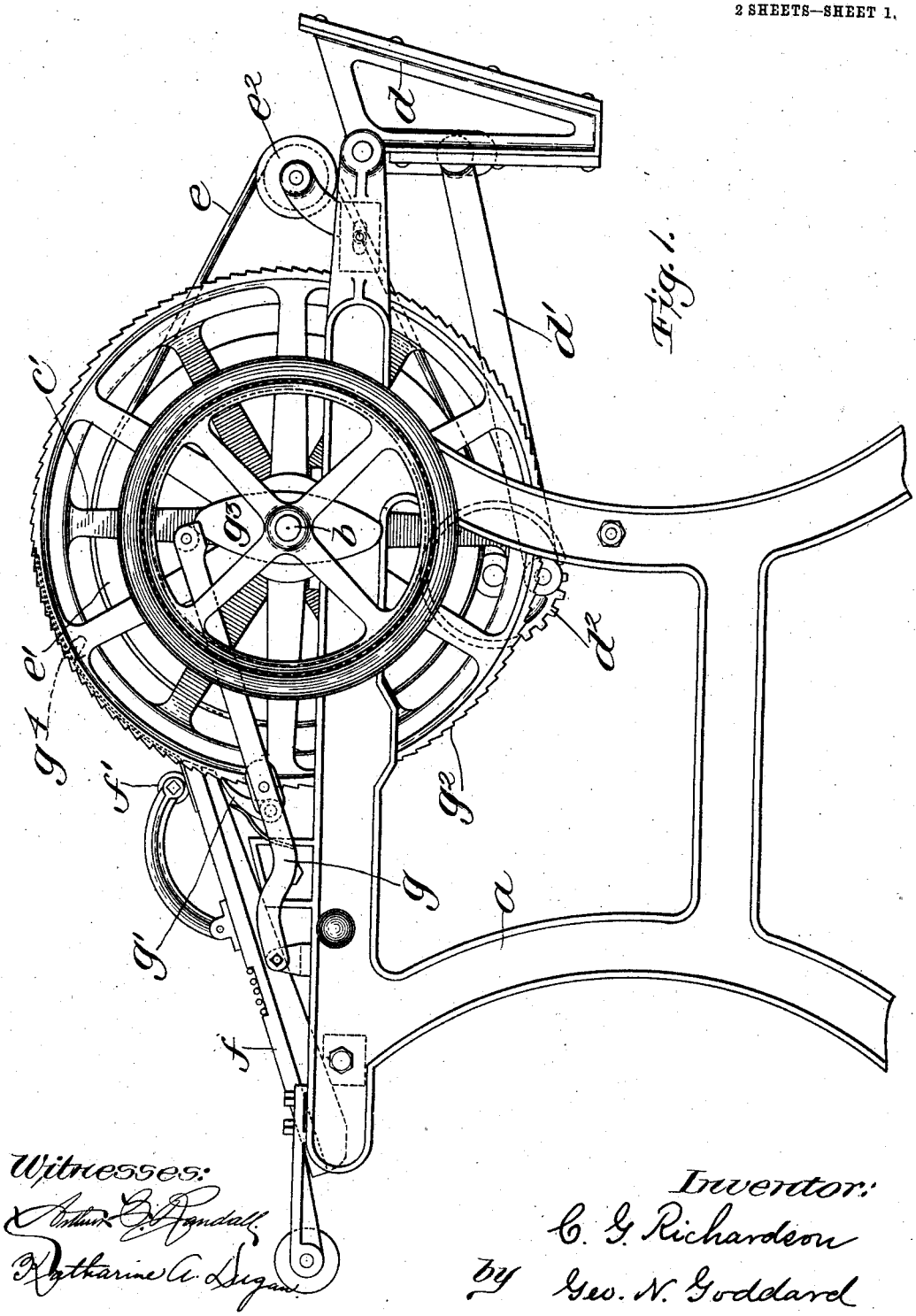

No. 883,669. PATENTED MAR. 31, 1908.
C. G. RICHARDSON.
CLOTH MEASURING MACHINE.
APPLICATION FILED AUG. 20, 1901.

2 SHEETS—SHEET 1.

Witnesses:

Inventor:
C. G. Richardson
by Geo. N. Goddard
Attorney.

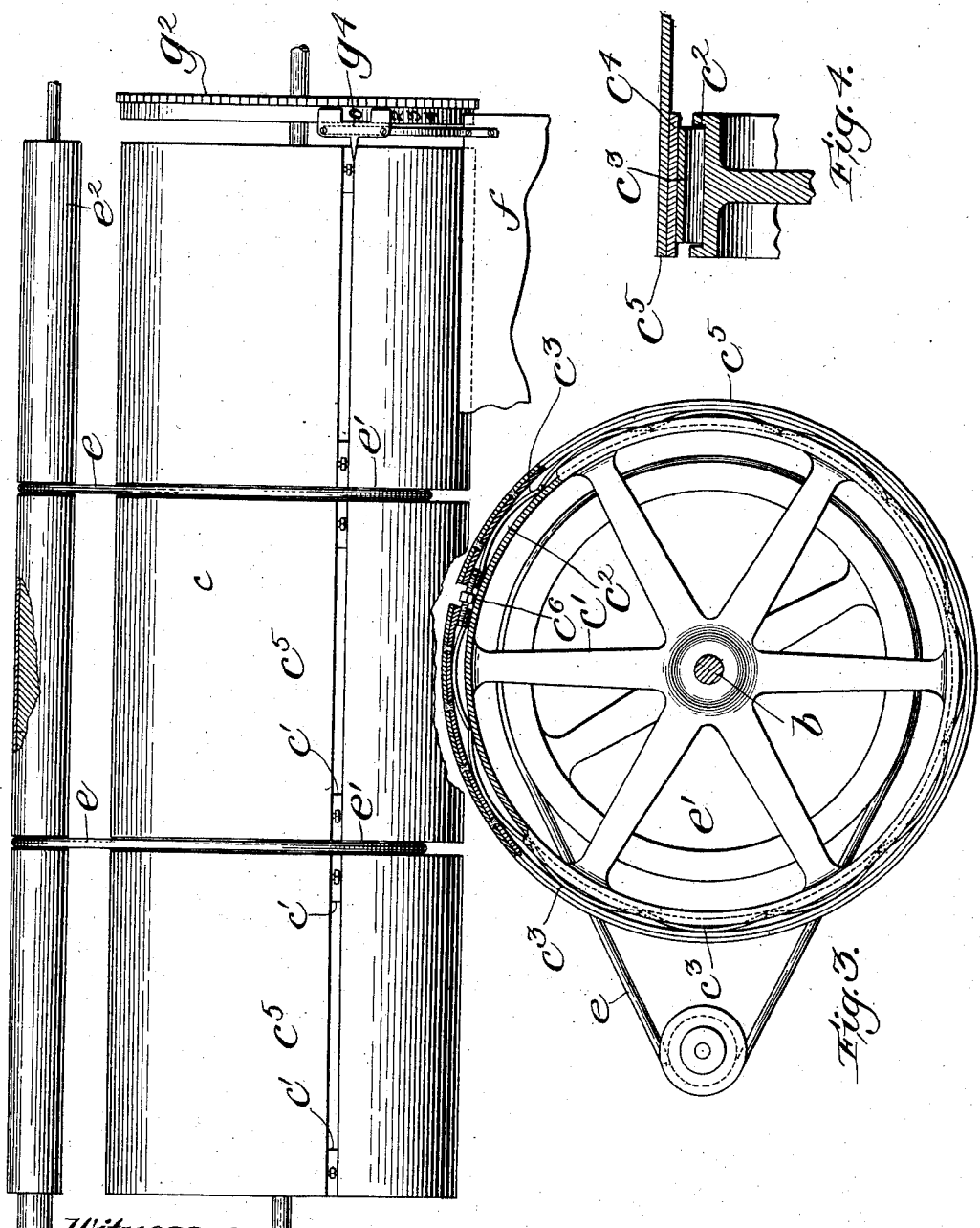

UNITED STATES PATENT OFFICE.

CHARLES G. RICHARDSON, OF SPRINGFIELD, VERMONT, ASSIGNOR TO PARKS & WOOLSON MACHINE COMPANY, A CORPORATION OF VERMONT.

CLOTH-MEASURING MACHINE.

No. 883,669.  Specification of Letters Patent.  Patented March 31, 1908.

Application filed August 20, 1901. Serial No. 72,653.

*To all whom it may concern:*

Be it known that I, CHARLES G. RICHARDSON, citizen of the United States, and resident of Springfield, Vermont, county of Windsor, have invented certain new and useful Improvements in Cloth-Measuring Machines, of which the following is a specification.

This invention relates to machines for measuring cloth or similar fabrics and is intended to provide a simple, efficient and reliable device for accurately measuring cloth.

The invention consists first in a new and improved construction of measuring drum or cylinder by which the circumference of said cylinder may be varied to compensate for the stretch of cloth in such a way that in all its positions of adjustment it retains the form of a true cylinder, thereby avoiding any objectionable features caused by throwing the drum out of true when making an adjustment.

Another feature which characterizes my invention consists in providing means for automatically removing the cloth from its frictional engagement with the drum and also delivering it to the folding device when such a device is used on the machine.

These and other features which characterize my invention will be more particularly explained and defined in the specification and the claims hereto annexed.

Referring now to the drawings, Figure 1 represents an end elevation of a complete machine embodying one form of my invention. Fig. 2 is a plan view of the measuring cylinder with means for removing the cloth automatically from its frictional engagement with said cylinder. Fig. 3 is an end elevation of the part shown in Fig. 2 a portion thereof being shown in section to more fully show the parts of the construction. Fig. 4 is a detail in longitudinal vertical section showing the method of supporting the measuring surface or plate upon the heads of the drum or cylinder.

While I have shown a complete machine in the drawings it will be necessary to explain only such parts thereof as are necessary to a full comprehension of my present invention, it being understood that the form, construction and arrangement of parts may be greatly varied from that herein shown and described without departing from my invention.

In its general features the machine comprises a suitable framework $a$ in which is mounted a shaft $b$ carrying a measuring cylinder or drum $c$ over whose periphery the cloth being measured passes, the periphery having a known or predetermined measurement and being combined with any suitable indicating device for registering the number of revolutions of the measuring cylinder. In this case the drum comprises a plurality of skeleton heads or wheels $c'$ which may be grooved or channeled at their peripheries as shown at $c^2$ to form a circumferential channel in which are arranged a series of bowed springs $c^3$ so as to surround each wheel or head. A flat sheet of flexible material $c^5$ preferably sheet metal, whose length is approximately equal to the desired circumference of the measuring drum or cylinder is laid around the heads so as to rest upon and be supported by the bowed springs $c^3$ in such a manner that the ends of the sheet metal plate or strip almost meet. If desired stiffening bands of metal may be interposed between the flexible sheet $c^5$ and the bowed supporting springs $c^3$ so as to prevent any inward spring or depression of the flexible sheet $c^5$ between the points of support formed by two adjacent springs. This construction permits the use of very thin sheet metal for the measuring surface.

At the place where the two ends of the sheet metal plate $c^5$ meet I employ suitable connecting means for holding them together in their desired relationship. The means herein shown for this purpose comprises a right and left screw $c^6$ provided with a nut intermediate of its ends to permit ready adjustment of the screw. As will be readily understood the turning of this screw $c^6$ in one direction draws the two ends of the sheet metal plate $c^5$ close together thereby compressing the bowed springs which support the plate and reducing the circumferential measure of the drum or cylinder. The turning of the adjusting screw in the reverse direction causes the two ends of the peripheral plates to move apart such expansive movement being accompanied by the expansion of the bowed springs. As the tension of the springs is equal all the way around the circumference, it will be seen that the expansion of the cylinder is not confined to any one part but is evenly distributed throughout the whole circumference of the drum thus avoiding any eccentricity of the drum as it is expanded or contracted which would be produced if the expansion or contraction was confined to a portion only of the circumference of the drum. In other words by this contrivance I provide a practically continuous surface which may be contracted or expanded readily in all directions to secure the desired adjustment in the circumference of the cylinder.

As will be understood by those skilled in the art the adjustment of the circumferential measure of the cylinder is made for the purpose of adapting the machine to accurately measure fabrics of different degrees of elasticity.

In order to prevent slip of the fabric upon the cylinder the peripheral plate $c^5$ is provided with a rough or frictional surface. A convenient surface for this purpose is obtained by coating the peripheral surface with fine sand so that the cloth will have a sufficient frictional engagement with the surface to prevent slip. As the sanded surface of the cylinder causes the cloth to hug closely to the cylinder as the latter rotates, I have devised means for automatically stripping or removing the cloth from its frictional engagement with the cylinder. The particular form of invention which I have herein shown comprises a plurality of belts $e$ $e$ which pass around pulleys $e'$ carried by the shaft $b$, the radii of said pulleys being shorter than the radius of the measuring drum so that the surface of the pulleys lies below or inside of the surface of the drum so that the belts passed around said pulleys are entirely below the contact surface or periphery of the drum for the greater part of its circumference, the belts passing outside of and intersecting the peripheral surface of the drum at the points where it is desired to remove or strip off the cloth. In order to conveniently effect this the periphery of the drum is made in three sections as clearly indicated in Fig. 2, a narrow space being left between the sections to permit the belt to pass inside of the drum and around their respective pulleys $e'$. The belts $e$ also pass over a roller $e^2$ arranged some distance outside of the drum on that side of the drum which is opposite the point where the cloth is fed to the drum.

At the front or feed side of the machine any suitable feed table or device may be provided as shown at $f$, Fig. 1. I have also shown a weight bar or roll $f'$ to act as a tension device to keep the cloth taut.

Any suitable indicating mechanism for registering the number of revolutions of the measuring cylinder may be employed. In this case I have shown a pivoted arm or lever $g$ provided with a pawl or dog $g'$ arranged to engage the teeth of a circumferential ratchet wheel $g^2$. The pivoted arm $g$ is operated by means of the eccentric cam $g^3$ so that each time the arm $g$ is swung upward the ratchet wheel $g^2$ is rotated one step or tooth. As here shown the cam will cause this arm to move the ratchet wheel twice for each complete revolution of the shaft $b$. If the drum is adjusted so that its circumference is two yards plus or minus whatever allowance may be necessary to be made for the stretch of the fabric, then each complete revolution of the shaft and drum will move the ratchet wheel forward two yards. The ratchet wheel may be provided with a suitable pointer and scale as indicated at $g^4$ and may be marked to indicate the number of yards to which its movement corresponds so that the operator can readily read the measurement as the cloth passes through the machine.

I may provide at the rear or delivery side of the machine a suitable folder. I have shown such a device here comprising an oscillating frame $d$ actuated by a pitman rod $d'$ from a gear wheel $d^2$. The roller $e^2$ may be positioned so as to deliver the cloth into the oscillating frame or folder $d$ after it has been stripped from the measuring cylinder.

The operation of the device is as follows: The cloth is fed in by hand from the feed table $f$ and under the weight bar or roll $f'$ and its end is placed in contact with the rough surface of the cylinder. Starting with the indicator at the zero point, it will be obvious that as the drum turns and the cloth moves along in contact with the frictional surface of the drum, the registering device will be actuated by the rotation of the drum, the ratchet wheel moving around step by step with each upward oscillation of the arm $g$. This action continues until the whole piece of cloth has passed over the drum, the cloth being fed out away from the drum on the farther side continuously by means of the feed out or stripping belts $e$. In case it is desired to measure some unusually distensible fabric such as cheese-cloth the length of the circumference of the drum may be increased by turning the adjusting screws $c^6$ until the cylinder is sufficiently enlarged to compensate for the extra stretch of the fabric. In measuring a non-distensible fabric the opposite adjustment should be made to compensate.

As the amount of stretch in the short length of fabric represented by the circumference of the drum is comparatively small it is not necessary to leave a wide space between the two ends of the peripheral plates which form the contact surface for the cloth. This construction gives therefore a practically continuous surface that in all positions of adjustment is concentric with the axis of the drum and also affords a simple and convenient means for automatically preventing the winding of the cloth around the drum after it has passed over the top.

Without attempting to set forth the manifold changes in form, construction and arrangement that may be made in the practice of my invention or all the uses to which it may be applied, what I claim is:

1. A cloth measuring machine embracing in combination a plurality of heads, a series of supporting springs arranged about the periphery of the heads, a flexible cloth supporting surface resting on said springs, means for varying the circumferential measure of the cloth supporting surface, substantially as described.

2. In a measuring machine, a measuring cylinder having a cylindrical surface for engaging the cloth to be measured, and means whereby all parts of the cylinder may be drawn equally on radial lines toward or away from the center in order to vary the circumferential measure of the cylinder without causing any eccentricity thereof, substantially as described.

3. A measuring cylinder for a cloth measuring machine embracing in its construction, a plurality of radially contractible and expansible heads or supports, a flexible sheet metal plate adapted to be supported about the periphery of said heads to form a substantially continuous cylindrical surface, and means for contracting and expanding the peripheral measurement of said cylinder without impairing its cylindrical form, substantially as described.

4. A cloth measuring machine embracing in combination a rotatable measuring cylinder whose peripheral surface is adapted to frictionally engage and draw forward the cloth, a registering device operatively connected therewith to record the revolutions of said cylinder, a traveling carrier for automatically stripping the cloth from its frictional engagement with said measuring cylinder as the cloth passes over the surface of the cylinder, substantially as described.

5. A cloth measuring machine embracing in combination a rotatable measuring cylinder whose periphery is roughened to engage and carry forward the cloth, a folding device, and a conveyer for stripping the cloth from its frictional engagement with the measuring cylinder and conducting it to the folding device, substantially as described.

6. In a measuring machine the combination of the measuring cylinder, a roll arranged outside of the cylinder, a plurality of belts arranged to pass around the axis of the cylinder below its operative surface and also around said roll, substantially as described.

7. In a cloth measuring machine the combination of the expansible measuring cylinder whose surface is made in longitudinal sections slightly separated from one another, a series of pulleys arranged to turn with said cylinder in the planes of the divisions between the sections, and a series of belts arranged to pass over said pulleys inside of the operative portion of the periphery of the cylinder and to pass outside of the peripheral surface of the cylinder at the points where the cloth is to be removed, substantially as described.

8. In a cloth measuring machine the measuring cylinder embracing in combination the integral heads, a series of springs arranged around the periphery of each head, a flexible sheet metal plate arranged to extend around and rest upon said springs with its ends slightly separated, and means for drawing together the adjacent ends of the sheet metal plates to contract the circumferential measure of the cylinder against the tension of the supporting springs, substantially as described.

9. In a cloth measuring machine the measuring cylinder embracing in combination the cylindrical heads provided with peripheral grooves or channels, a series of bowed springs arranged around the periphery of the heads and resting in said channels, a flexible plate, a cloth supporting surface supported upon said springs and being capable of contraction or expansion in order to vary the circumferential measure of the cylinder, substantially as described.

10. In a cloth measuring machine the measuring cylinder embracing the combination of a series of supporting heads, a series of supporting springs arranged around the peripheries of said heads, and a cloth supporting and engaging surface resting upon said springs, and means for varying the effective circumference of the drum by compressing said springs or allowing them to expand, substantially as described.

11. A measuring cylinder embracing in its construction a shaft, a series of sheet metal cylindrical sections secured to said shaft, a series of pulleys arranged between the sections, said pulleys being of smaller diameter than the sections, a roll situated on the delivery side of the measuring cylinder, and a series of belts passing over said pulleys and around said roll, substantially as described.

12. In a cloth measuring machine, a measuring cylinder embracing in its construction a shell formed of a sheet metal plate bent into cylindrical form with its opposite edges held near together, compressible heads arranged to form an internal support for said cylindrical surface, means for drawing the adjacent edges of the shell nearer together, said means acting to compress the internal supports, substantially as described.

In witness whereof, I have hereunto set my hand, this 17th day of August 1901.

CHARLES G. RICHARDSON.

In the presence of—
 FRANK STONE,
 CHAS. C. KEYES.